United States Patent
Yamamoto et al.

(10) Patent No.: US 6,852,420 B2
(45) Date of Patent: Feb. 8, 2005

(54) OPTICAL DEVICE, MOLD, AND METHOD OF PRODUCING THE SAME

(75) Inventors: Hiroaki Yamamoto, Osaka (JP); Masahiro Hori, Osaka (JP); Koichiro Nakamura, Osaka (JP); Kenichi Nakama, Osaka (JP); Katsuhide Shimmo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 166 days.

(21) Appl. No.: 10/001,201

(22) Filed: Dec. 4, 2001

(65) Prior Publication Data

US 2002/0109069 A1 Aug. 15, 2002

(30) Foreign Application Priority Data

Dec. 4, 2000 (JP) .......................... 2000-368286
Nov. 28, 2001 (JP) .......................... 2001-363197

(51) Int. Cl.⁷ .......................... B32B 9/00; B32B 17/06; B28B 7/00
(52) U.S. Cl. .......................... 428/446; 249/60; 249/83; 249/114.1; 249/134; 428/428; 428/432
(58) Field of Search .......................... 249/60, 116, 83, 249/134; 428/446, 428, 432; 425/810

(56) References Cited

U.S. PATENT DOCUMENTS

| | | | | |
|---|---|---|---|---|
| 5,501,784 A | * | 3/1996 | Lessmollmann et al. | 205/67 |
| 5,769,997 A | * | 6/1998 | Akaike et al. | 156/273.1 |
| 6,010,609 A | * | 1/2000 | Mimura et al. | 205/70 |
| 6,119,485 A | * | 9/2000 | Hibino et al. | 249/116 |
| 6,343,854 B1 | * | 2/2002 | Kurosawa | 347/55 |
| 6,633,716 B2 | * | 10/2003 | Csutak | 385/131 |
| 2002/0100859 A1 | * | 8/2002 | Yagi et al. | 249/116 |

FOREIGN PATENT DOCUMENTS

| | | |
|---|---|---|
| DE | 41 33 897 | 4/1993 |
| JP | 4-164841 | 6/1992 |
| JP | 10-26707 | 1/1998 |
| JP | 10-026707 | * 1/1998 |

OTHER PUBLICATIONS

Taiwanese Office Action dated Dec. 30, 2003.
English translation of Taiwanese Office Action.

* cited by examiner

Primary Examiner—Deborah Jones
Assistant Examiner—G. Blackwell-Rudasill
(74) Attorney, Agent, or Firm—Whitham, Curtis & Christofferson, P.C.

(57) ABSTRACT

According to the present invention, there is provided a mold constituted by an electrically conductive thin plate having a predetermined surface shape, and an electrically insulating reinforcement material, wherein the electrically conductive thin plate and the electrically insulating reinforcement material are bonded to each other by an anodic bonding method. Particularly, the electrically conductive thin plate is preferably formed out of silicon single crystalline and the electrically insulating reinforcement material is preferably oxide glass.

10 Claims, 2 Drawing Sheets

OPTICAL DEVICE, MOLD, AND METHOD OF PRODUCING THE SAME

BACKGROUND OF THE INVENTION

The present invention relates an article, such as a micro-optical device, an information recording medium substrate, or the like, having a predetermined surface shape on a front surface of a substrate, and a mold (or die) used for producing the article by transfer under pressure.

The forming technique carried out by pressing a mold is widely used for mass-production of optical components such as CD-ROMs and other information recording media, planar micro-lenses (lens arrays in each of which a large number of micro-lenses are arrayed one- or two-dimensionally on a substrate), Fresnel lenses, diffraction grating devices, optical wave guide devices, and so on. A resin is generally used as the molding material. A glass material produced by a so-called sol-gel method is, however, used for application which requires severe limitation on heat resistance, weather resistance, and so on. In this sol-gel method, a mold (or a die) having a predetermined surface shape is pressed against a sol-gel material, which has been applied onto a predetermined substrate to have a predetermined thickness, under application of heat for a specific time. Then, the mold is released from the sol-gel material and then the sol-gel material is sintered or solidified again, so that an article having a desired surface shape and a predetermined thickness can be obtained.

In the sol-gel method as described above, however, pressing and heating need to be performed simultaneously in order to transfer the shape of the mold to the article with high accuracy.

On the other hand, silicon is an example of the material for the mold. As a method of producing a shape to be transferred, a surface of a single crystalline silicon wafer is coated with a photo resist and patterned by a photolithographic technique, so that V-shaped grooves are produced by wet-etching. Since anisotropy of etching speed with respect to crystal direction is utilized, silicon has an advantage in that shape control can be made with a high degree of reproducibility.

The thickness of the silicon wafer generally used is, however, thin in a range of from about 0.5 mm to about 1 mm. For this reason, when the mold is pressed against the article, there may occur a case in which the load is imposed unevenly on the mold at a point of time before the article is cured. In such a situation, the thin silicon wafer may be cracked and damaged. It may be possible to use a silicon wafer having a larger thickness instead. However, even if the thickness of the wafer is increased, the strength against cracking cannot be improved satisfactorily because of brittleness. Material cost increases. Therefore, a mold in which a substrate having a specific strength, such as a glass plate or the like, is stuck by an adhesive agent onto the rear surface of the thin silicon wafer having a molding shape has been used. In such a manner, a mold having both a highly accurate molding shape and strength against pressing has been put into practical use. Also, a technology, in which a silicon single crystal is processed to have a diffraction grating shape on a surface thereof to be used as a diffraction grating, is known (see Japanese patent Kokai Hei. 10-26707).

In the case where a sol-gel material is used as an article, the mold has to be heated as described above. Accordingly, when an adhesive agent, an adhesive tape, or the like, is used for bonding the silicon wafer and the glass substrate to each other, the adhesive agent, the adhesive tape, or the like, needs to have heat resistance to the temperature at the time of pressing. The temperature for heating may be not lower than 150° C. Most of general adhesive agents or adhesive tapes cannot be used at the aforementioned high temperature for production of the article. In addition, even if the adhesive agents or tapes could be used, adhesive power would be lowered with the passage of time. Accordingly, there has been a problem in reliability.

The specific examples experienced by the present inventors will be described below.

A mold was produced as follows. A 1 mm-thick silicon plate (25×25 mm) having a diffraction grating shape formed in its surface was bonded to a 7 mm-thick sheet of glass (borosilicate glass of #7740 made by Corning) having the same shape as the silicon plate, by a heat-resistant adhesive agent SE5080 made by Sin-Etsu Silicon Co., Ltd. This mold was used to press a sol-gel solution at 200° C. for 30 minutes (detailed conditions will be described later). After that, the sol-gel solution was intended to be released from the mold but the silicon plate and the sheet of glass were stripped one from the other, and the strength of the heat-resistant adhesive agent could not be maintained at the temperature of 200° C. Then, in order to perform mold release, a jig was inserted between the silicon plate and the article. This operation was however difficult and both the silicon plate and the article were damaged.

In another case, the same silicon plate and the same sheet of glass #7740 made by Corning as described above were bonded to each other by a double-coated adhesive tape #4390 (thickness: 0.13 mm) made by 3M Company. In the same manner as described above, the mold was used to press the sol-gel solution, and then the sol-gel solution was released from the mold. The PV (Peak to Valley) value of the diffraction grating shape formed in the front surface of the silicon plate was 0.17 $\mu$m when it was measured before bonding, whereas the PV value of the article was 0.45 $\mu$m, which indicated that the silicon plate was deformed because of the deformation of the double-coated adhesive tape at the time of molding.

In fact, when a diffraction grating manufactured from a silicon single crystalline is mounted to an apparatus to be used, a silicone plate processed to have a finely surface-relief shape must be thin in view of the cost. In this case, however, it is difficult to fix the diffraction grating without warp and deformation of the substrate. The use of a thick silicon plate results in the cost increase as mentioned above.

SUMMARY OF THE INVENTION

An object of the present invention is to solve the above-mentioned problems and to provide a mold which can be used for molding a sol-gel material, and a method of producing the mold. Another object of the present invention is to provide an optical device and a method of producing the optical device.

According to an aspect of the present invention, there is provided a mold constituted by an electrically conductive thin plate having a predetermined surface shape, and an electrically insulating reinforcement material, wherein the electrically conductive thin plate and the electrically insulating reinforcement material are bonded to each other by an anodic bonding method. Particularly, the electrically conductive thin plate is preferably formed out of silicon single crystal and the electrically insulating reinforcement material is preferably oxide glass.

According to another aspect of the present invention, there is provided a method of producing a mold, constituted by the steps of: processing a front surface of an electrically conductive thin plate into a predetermined shape; smoothening a rear surface of the electrically conductive thin plate; and bringing the rear surface of the electrically conductive thin plate into contact with a front surface of an electrically insulating reinforcement material, heating the electrically conductive thin plate and the electrically insulating reinforcement material, and simultaneously applying a DC voltage between the electrically conductive thin plate and the electrically insulating reinforcement material while using the electrically conductive thin plate as an anode. When the electrically conductive thin plate is formed out of silicon single crystalline, a predetermined surface shape can be formed by anisotropic etching. The electrically insulating reinforcement material is preferably oxide glass.

According to yet another aspect of the present invention, there is provided an optical device constituted by an electrically conductive thin plate having a predetermined surface shape, and an electrically insulating reinforcement material, wherein the electrically conductive thin plate and the electrically insulating reinforcement material are bonded to each other by an anodic bonding method. Particularly, the electrically conductive thin plate is preferably formed out of silicon single crystalline and the electrically insulating reinforcement material is preferably oxide glass.

According to still another aspect of the present invention, there is provided a method of producing a mold, constituted by the steps of: processing a front surface of an electrically conductive thin plate into a predetermined shape; smoothening a rear surface of the electrically conductive thin plate; and bringing the rear surface of the electrically conductive thin plate into contact with a front surface of an electrically insulating reinforcement material, heating the electrically conductive thin plate and the electrically insulating reinforcement material, and simultaneously applying a DC voltage between the electrically conductive thin plate and the electrically insulating reinforcement material while using the electrically conductive thin plate as an anode. When the electrically conductive thin plate is formed out of silicon single crystalline, a predetermined surface shape can be formed by anisotropic etching. The electrically insulating reinforcement material is preferably oxide glass.

The present disclosure relates to the subject matter contained in Japanese patent application Nos. 2000-368286 (filed on Dec. 4, 2000) and 2001-363197 (filed on Nov. 28, 2001), which are expressly incorporated herein by reference in their entireties.

DESCRIPTION OF THE PREFERRED EMBODIMENT

Figure 1:
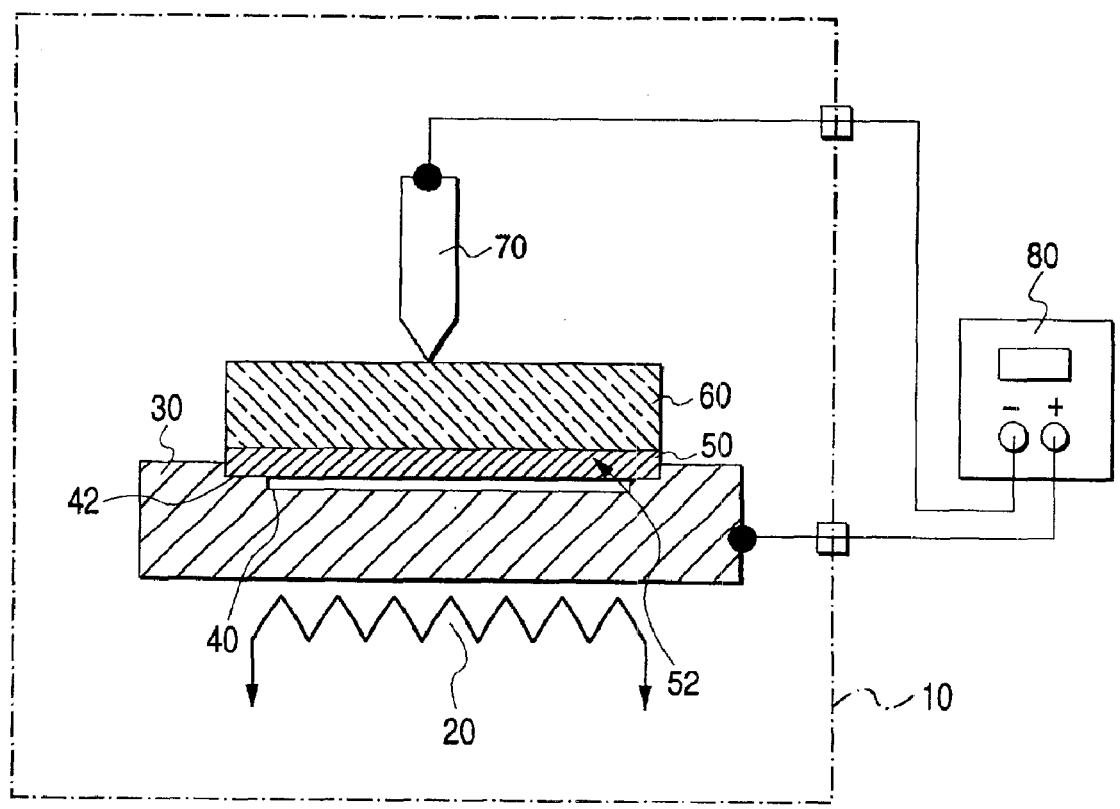
FIG. 1 is a schematic view of an anodic bonding apparatus according to the present invention.

In a mold according to the present invention, the portion having a predetermined shape to be used as the original to be transferred is made of an electrically conductive material and is bonded to an electrically insulating reinforcement material having a certain specific strength. Although silicon is typical of the electrically conductive material, any metal material such as nickel, copper, aluminum, or the like, may be used. When silicon single crystal is used, groove processing can be performed by etching using anisotropy of the single crystal. The single crystal has a feature that V-shaped grooves can be produced with a high degree of reproducibility. Further, the metal such as nickel, copper, aluminum, or the like, is suitable for producing a predetermined molding shape because the metal is easily processed.

The mold used for production of optical components is generally provided with convex or concave portions formed in its surface. Examples of each convex portion may include a spherical shape, a conical shape, a pyramidal shape, and so on. A required number of such convex portions are provided wholly or partially on the surface of a mold release coating. On the other hand, when a slit is provided as the concave portion, the slit is provided linearly or curvilinearly. When a plurality of slits are provided as the concave portions, the concave portions maybe aligned concentrically or shaped like a grid. In accordance with these predetermined shapes, the shape of each optical component such as a surface-relief diffraction grating, a V-grooved shape, a micro-lens array, a Fresnel lens, or the like, is formed, so that the period of the shape is produced in a range of from the order of submicrons to the order of hundreds of microns.

In the process of producing an optical component having a predetermined surface shape, a material for forming an article is closely contacted with and between a support and a mold so as to be disposed in the form of a film. Then, the material is pressurized and heated so that the surface shape of the mold is transferred onto the material. At this time, some kinds of the material may require the high pressure to be applied and the high temperature to be applied. In such a case, the electrically conductive mold may be unable to withstand the pressure by itself. As a method for reinforcing such a mold, a reinforcement material may be stuck to the rear surface of the mold.

According to the present invention, an electrically conductive material such as a metal having a predetermined shape obtained by the above-mentioned method is bonded to a reinforcement material such as glass by anodic bonding. Because bonding based on anodic bonding needs no adhesive agent, a mold which can be remarkably improved in heat resistance and which can be used steadily for a long term can be provided.

If one that has been formed from silicon single crystal is used as a diffraction grating, not a mold, the diffraction grating can be obtained by reinforcing the silicon single crystal with an insulating reinforcement material fixed thereto by anodic bonding in accordance with the above-mentioned method. Such a diffraction grating can be used so that the flatness of its surface is maintained in mounting the grating to an apparatus. Although the surface flatness to be maintained depends on the purpose of the apparatus, the surface flatness is, in general, 2.0 μm or less, preferably 1.0 μm or less, and more preferably 0.4 μm or less.

The principle of anodic bonding for bonding metal and oxide glass to each other will be described briefly.

After metal is brought into contact with oxide glass, a plus DC voltage is applied to the metal while a minus DC voltage is applied to the oxide glass. Generally, space electric charges are formed in the glass at a high temperature, so that the metal and the glass are stuck close to each other by electrostatic attraction force. Further, oxygen ions in the oxide glass migrate to the interface between the oxide glass and the metal, so that covalent bonds are generated between the oxygen ions and the metal ions. These bonds produce strong adhesive power. Since such bonding is based on the above-mentioned principle, any material may be used if the material is conductive and can form covalent bonds between the material and the oxygen. That is, the material is not limited to metal. It is however undesirable to use a material consisting of an element which is apt to enter the glass under the presence of an electric field.

In the present invention, since the shape of the mold is formed out of an electrically conductive material, the reinforcement material is selected to be oxide glass. Any material can be used as the reinforcement material without the above-mentioned limitation, if the material can generate space electric charges of oxygen ions in the surface of the material upon application of an electric field. Since the reinforcement material is heated from room temperature, a material having a thermal expansion coefficient near that of the electrically conductive material is preferably used as the reinforcement material.

When, for example, the electrically conductive material is silicon, borosilicate glass #7740 made by Corning, which is substantially the same in thermal expansion coefficient as the silicon and which contains alkali metal, is adapted to the aforementioned condition. The glass #7740 mainly consists of $SiO_2$ of 80%, $B_2O_3$ of 12%, $Al_2O_3$ of 2%, CaO of 0.3%, $Na_2O$ of 4% and $K_2O$ of 0.2% by weight. Since the glass #7740 made by Corning contains Na or the like as alkali metal, when the temperature comes into a range of from 300° C. to 400° C., alkali ions can migrate in the glass. When a plus DC voltage of the order of hundreds of volts is applied to the silicon while a minus DC voltage of the order of hundreds of volts is applied to the glass, the alkali ions migrate due to the generated electric field so that a space electric charge layer of negative electric charges is formed near the interface between the silicon and the glass. In such a manner, electrostatic attraction force is produced so that the glass and the silicon are attracted to each other. Finally, the rear surface of the silicon wafer and the front surface of the glass substrate are stuck close to each other, so that oxygen ions in the space electric charge layer partially migrate to a neighborhood of the interface due to the intensive electric field and covalent bonds are produced between the silicon and the oxygen ions. Since the glass #7740 made by Corning has thermal expansion coefficient of $32.5 \times 10^{-7}/°$ C., which is substantially the same as thermal expansion coefficient of silicon ($24 \times 10^{-7}/°$ C.), it is possible to eliminate the breakage of the silicon substrate or the like due to thermal expansion.

As to the order of the anodic bonding and the processing of a predetermined surface shape, the electrically conductive substrate may be anodic-coupled to the insulating reinforcing material after the predetermined surface shape is formed on the electrically conductive substrate, and alternatively, the predetermine surface shape may be formed on the electrically conductive substrate after the electrically conductive substrate is anodic-coupled to the insulating reinforcing material.

The method of producing a mold according to the present invention will be described below more specifically.

Opposite surfaces of a silicon wafer having a thickness of about 1 mm were mirror-finished. A silicon oxide film was formed by putting the silicon wafer into an oxygen atmosphere of 1000° C. A photo resist was applied on the silicon oxide film of one of the opposite surfaces of the silicon wafer and then patterning was applied thereto by use of a stripe-like photo mask. While the photo resist developed into a stripe shape was used as a mask, a pattern was formed in the silicon oxide film using ammonia-containing HF aqueous solution. Using this silicon oxide film pattern as a mask, the surface of the wafer was etched with an aqueous-isopropanol solution of KOH. Then, the silicon oxide film was removed. In such a process, about 1000 linear V-shaped grooves were formed in the surface of the silicon wafer. The size of each of the grooves was selected so that the width of the groove was 25 μm, the depth of the groove was 15 μm, and the interval between two adjacent grooves (measured between the centers of the grooves) was about 25 μm. The portion processed into a diffraction grating surface shape having a triangular section was formed as a square of 23×23 mm and the wafer was cut into a size of 25×25 mm. That is, the circumferential width of the square silicon plate was left by 2 mm as a smooth surface in order to make the contact between silicon and an electrode good at the time of anodic bonding. The zero-order light wave aberration of the silicon plate having the diffraction grating surface shape was 0.17 μm in terms of PV value.

Next, the silicon plate was anodically bonded with a sheet of Corning-made #7740 glass having a size of 25×25×7 mm. As shown in FIG. 1, an electrode plate 30 having a heater 20 was disposed in a vacuum tank 10. A depression 40, which was 23.5 mm square, was provided in the center of the electrode plate 30. A silicon plate 50 was disposed so that the grooved surface of the silicon plate 50 was placed on the electrode plate side. At that time, in order to protect the processed portion 52, the processed portion was aligned with the portion of the depression 40 in the electrode plate 30. For the alignment, preferably, a 2-stage depression 42 was provided in the electrode plate. A glass substrate 60 (Corning-made #7740 glass) was superposed on the rear surface of the silicon plate. A probe electrode 70 was brought into contact with the front surface of the glass substrate 60.

After the vacuum tank 10 was sealed hermetically and evacuated, the electrode plate 30 was heated to a temperature of 400° C. by the heater 20. A DC voltage of 600 V was applied between the electrodes in the vacuum tank by a high-voltage DC power supply 80 located outside the vacuum tank. Thus, a mold having a size of 25×25×8 mm and having a diffraction grating shape in the surface of the silicon plate was obtained. The wave aberration of the mold was 0.17 μm in terms of PV value. This value remained the same as the value before anodic bonding.

Next, a mold release coating was formed on the surface of the mold. The mold was put into the vacuum evaporation apparatus. A film of titanium (Ti) 80 nm thick was formed as an undercoat layer on the surface of the diffraction grating. Next, a layer of platinum (Pt) 170 nm thick was formed as a protective layer thereon. Further, this mold obtained thus was put into a vacuum sputtering apparatus, so that a film of gold (Au) 53 nm thick was formed as a mold release coating on the Pt layer by a sputtering method.

Figure 2:
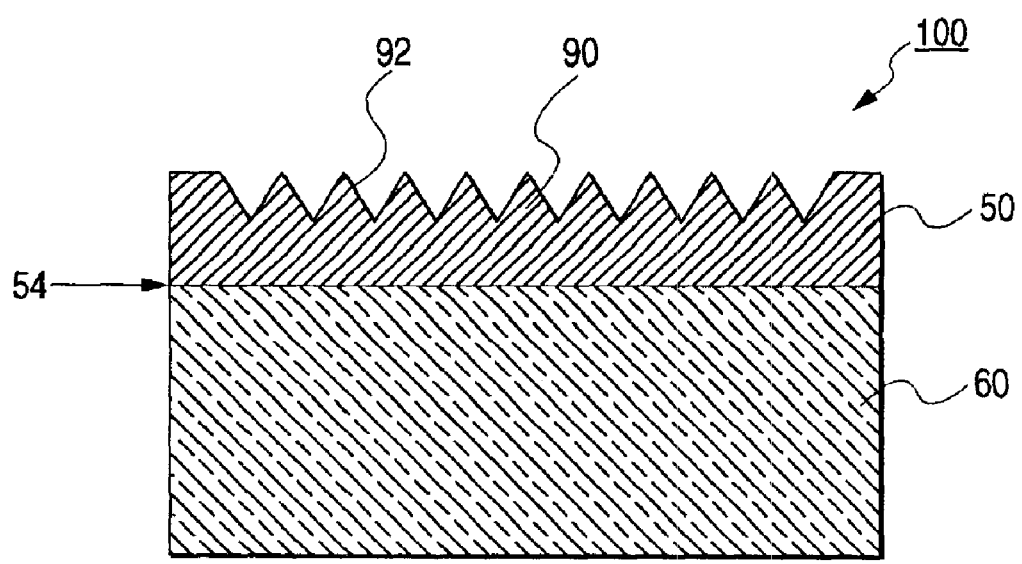
FIG. 2 is a schematic sectional view of a mold according to the present invention.

Thus, a mold 100 having a diffraction grating shape 90 in the front surface of the silicon plate 50 as shown in FIG. 2 was obtained. A mold release coating 92 was provided on the front surface of the diffraction grating while a surface 54 anodically bonded with the glass substrate 60 is formed in the rear surface of the silicon plate 50, so that the mold 100 was reinforced to have a sufficient strength. Next, the mold was used so that a molding experiment was performed by a sol-gel method.

As materials of the molding article, 0.19 mol of phenyltriethoxysilane, 0.04 mol of dimethyldiethoxysilane and 0.04 mol of (3,3,3-trifluoropropyl) trimethoxysilane were put into a beaker and stirred. To this liquid, 0.25 mol of ethanol was added and stirred, and then, an aqueous solution, which was obtained by dissolving formic acid into 1.75 mol (31.5 g) of water so that the formic acid became 0.01% by weight, was further added and stirred for 2 hours. In the initial stage of the stirring, the liquid was separated into 2 layers. After stirring for 2 hours, however, the liquid became a transparent homogeneous solution. When this solution was heated in an oven at 80° C. for 12 hours, ethanol, an aqueous solution of formic acid, water produced by a condensation polymerization reaction, and so on, were volatilized. As a result, the solution having an initial weight of about 103.3 g and an initial volume of about 100 cm$^3$ was reduced to about 30% respectively so that the resulting weight and volume were about 27 g and about 30 cm$^3$ respectively. The solution obtained thus was used as a sol-gel solution.

The sol-gel solution was applied onto the surface of the mold to thereby form a layer about 60 μm thick. This layer was heated at 140° C. for 7 minutes. By this heating process, a plastically deformable gel film (viscosity: 104 to 108 poise) was formed on the mold. After that, a quartz glass substrate 3.0 mm thick and 2.5 cm square was mounted on the coated surface (gel film). In such a state, the quartz glass substrate and the coated surface were heated at 200° C. for 30 minutes while the quartz glass substrate was pressed against the coated surface under a pressure of 2 kg/cm$^2$. As a result, the coated surface was bonded to the quartz glass substrate. After the coating film was perfectly gelated, the coating film was air-cooled naturally. The Corning-made #7740 glass portion of the mold and the quartz glass substrate were separated from each other while these portions were fixed. Thus, mold release was carried out. As a result, a diffraction grating molding article having the film (mean film thickness: 30 μm) to which the shape of the mold was transferred and the quartz glass substrate on which the film was deposited was obtained. In order to measure diffraction efficiency of the diffraction grating molding article, a gold (Au) reflective coat having a reflectance of 60% (with respect to light having a wavelength of 1550 nm) was formed on the surface of the diffraction grating molding article by a sputtering method.

On the thus obtained diffraction grating molding article, diffraction efficiency was measured and observation was made microscopically. The measurement of diffraction efficiency was made as follows. A laser beam 1550 nm long obtained from a wavelength convertible laser light source was made incident on the diffraction grating, so that the intensity of the diffracted light was measured by a photo detector and the quantity of the light incident on the diffraction grating was measured by one and the same photo detector. By comparing these two measured values, the diffraction efficiency was evaluated.

As a result, it was found that the obtained diffraction efficiency of the mold with respect to the 26-order diffracted light was 60% to light having a wavelength of 1550 nm, whereas the obtained efficiency of the diffraction grating with respect to the of the 26-order diffracted light was 60%, so that transferring was performed with a high degree of reproducibility.

On the other hand, it was found as a result of the microscopic observation that the depth of the diffraction grating molding article was in a range of from 14.7 μm to 15.3 μm and the pitch of the diffraction grating molding article was in a range of 24.2 μm to 25.1 μm whereas the depth of the mold was 15 μm and the pitch of the mold was 25 μm as described above, so that transferring was performed with high accuracy.

Further, the wave aberration of the diffraction grating molding article was 0.17 μm in terms of PV value. This value was substantially the same as the value for the mold.

The above explanation is directed to the mold. Next, a discussion will be made as to a case where the mold per se is used as a diffraction grating. To use, as the diffraction grating, the mold having the diffraction grating shape 90 in the front surface of the silicon plate 50 as shown in FIG. 2 and manufactured in the aforementioned manner, a glass substrate was bonded to a surface opposite from a surface where the diffraction grating shape is provided, by anodic bonding. In this case, the zero-order light wave aberration of the diffraction grating was, in terms of PV value, 0.16 μm before anodic bonding, and 0.17 μm after anodic bonding, showing that no substantive change occurred. In contrast thereto, in case of a silicon plate diffraction grating not reinforced by a glass substrate, the PV value of 0.16 μm was increased to 1.62 μm, showing that the flatness could not be maintained.

It became clarified from the above experimental result that the mold according to the present invention was effective in the case where the molding article required to be heated at a high temperature and pressurized was used, so that the mold was adapted particularly for the sol-gel material. Further, it was also clarified that the optical device according to the present invention was suitably used as an optical component, such as a diffraction grating, having a predetermined surface shape.

As described above, according to the present invention, the mold having a predetermined shape and by which a mold release operation can be performed easily can be obtained. Hence, the mold can achieve higher speed of the producing process, reduction in rejection rate and improvement in dimensional accuracy compared with the conventional article or mold having a predetermined surface shape. Further, an optical device, the strength of which is increased with a reinforcing material, can be obtained.

What is claimed is:

1. A mold comprising:

an electrically conductive thin plate having on a front surface a fixed and predetermined nonplanar surface shape for molding a molded object; and an electrically insulating reinforcement material bonded to a rear surface of the thin plate; wherein said electrically conductive thin plate and said electrically insulating reinforcement material are bonded to each other by an anodic bond comprising atoms migrated by an electric field.

2. A mold according to claim 1, wherein said electrically conductive thin plate is formed out of single crystal silicon.

3. A mold according to claim 1, wherein said electrically insulating reinforcement material is oxide glass.

4. An optical device comprising:

an electrically conductive thin plate having on a front surface a fixed and predetermined nonplanar surface shape; and an electrically insulating reinforcement material bonded to a rear surface of the thin plate; wherein said electrically conductive thin plate and said electrically insulating reinforcement material are bonded to each other by an anodic bond comprising atoms migrated by an electric field.

5. An optical device according to claim 4, wherein said electrically conductive thin plate is formed out of single crystal silicon, said electrically insulating reinforcement material is oxide glass, and a diffraction grating is formed in the single crystal silicon as said fixed predetermined nonplanar surface shape.

6. An optical device according to claim 5, wherein the diffraction grating has a flatness in terms of PV value of 2.0 microns or less.

7. A mold according to claim 1, wherein the fixed predetermined nonplanar surface shape comprises a diffraction grating.

8. An optical device according to claim 4, wherein the fixed predetermined nonplanar surface shape comprises a diffraction grating.

9. A mold according to claim 1, wherein an interface between the electrically conductive thin plate and the electrically insulating reinforcement material is planar.

10. An optical device according to claim 4, wherein an interface between the electrically conductive thin plate and the electrically insulating reinforcement material is planar.

* * * * *